Patented Oct. 6, 1931

1,826,679

UNITED STATES PATENT OFFICE

CYRIL J. STAUD AND THOMAS F. MURRAY, JR., OF ROCHESTER, NEW YORK, ASSIGNORS TO EASTMAN KODAK COMPANY, OF ROCHESTER, NEW YORK, A CORPORATION OF NEW YORK

METHOD OF IMPROVING CELLULOSE ESTER FILMS

No Drawing. Application filed March 9, 1929. Serial No. 345,884.

This invention relates to cellulose ester films and particularly to a method of preparing such films.

Cellulose ester films are prepared by dissolving esters such as cellulose nitrate and cellulose acetate in suitable solvents with softening agents and plastifiers and depositing the "dope" on a smooth surface upon which it hardens in the form of a thin film. Such films are employed for various purposes, for example as supports for light-sensitive emulsions employed in photography or in the lacquer industry. An important and necessary characteristic of unsupported films is flexibility. They are frequently rolled on spools and are employed in apparatus which necessitates repeated bending of the films. It is usual therefore to subject films to tests for flexibility. A device known as the Schopper tester has been devised for this purpose and indicates the relative flexibility of the film by the number of folds to which the film may be subjected without breaking.

It is the object of the present invention to provide a method of preparing films whereby the flexibility of film produced from cellulose esters such as the nitrate and acetate may be materially improved.

We have discovered that cellulose ester films prepared in accordance with the usual procedure may be made more flexible by a subsequent treatment which effects the de-esterification of the cellulose ester in the film composition. The agents employed for de-esterification are numerous and depend upon the particular composition of the film. The procedure consists in immersing the film in a solution containing the de-esterification agent for a suitable period to effect the partial de-esterification of the cellulose ester. The degree of de-esterification should accomplish the desired increase in flexibility which should be such as to accomplish the improvement required to permit the use of the film for its intended purpose. In some instances, a relatively slight increase in flexibility is sufficient. For certain purposes very flexible films are necessary, and a more complete treatment may, under such circumstances, be advisable.

It is necessary to select a de-esterification agent which is capable of accomplishing the desired result with a film of given composition. Thus a film which consists of cellulose nitrate may be improved by treatment with a solution of ammonium hydrosulphide; whereas, the de-esterification of a cellulose acetate film may be accomplished by immersing the film in a solution of sodium hydroxide for example. Other de-esterification agents may be employed, but those mentioned have been found to give satisfactory results and especially to produce a marked improvement in the flexibility of films of the character described.

The invention will be more readily understood by reference to the following specific examples, it being understood that these are merely illustrative of the application of the invention.

*Example 1.*—For the de-esterification of cellulose nitrate film prepared in the usual manner, we employ a solution of ammonium hydrosulphide containing approximately 13% of ammonium hydrosulphide. Two and one-quarter kilograms of the solution is diluted with 7.5 liters of water, the dilute solution containing therefore approximately 3% of ammonium hydrosulphide. The sheets of cellulose nitrate film are suspended in this solution which is maintained at a temperature of from 20° to 30° C. After varying periods of time, the sheets have different flexibility as indicated by the Schopper tester as follows:

| | Folds |
|---|---|
| Flexibility of original cellulose nitrate film | 18 |
| After 1 hour of de-esterification | 18 |
| After 2 hours of de-esterification | 20 |
| After 3 hours of de-esterification | 27 |
| After 4 hours of de-esterification | 39 |
| After 6 hours of de-esterification | 66 |

It will be noted that the flexibility of the film is markedly improved, particularly after four hours of treatment and that treatment for additional time up to six hours effects a still greater improvement so that the film is more than three times as flexible when the treatment is completed.

In the de-esterification of cellulose acetate we have found that the softener which is used in the composition affects the rate of de-esterification, and that films which do not contain a softener become brittle when completely de-esterified. Such films, on the other hand, show remarkable flexibility when partially de-esterified so that there is a thin layer of cellulose acetate between two de-esterified layers. This result is indicated in the following example.

*Example 2.*—Sheets of cellulose acetate film containing no softener were immersed in sodium hydroxide of one-half normal concentration (2% by weight) at 20° to 30° C. The sheets were removed after varying intervals and showed flexibility on the Schopper tester as follows:

| | Folds |
|---|---|
| Original material | 3.5 |
| Sample removed after ¼ hour of de-esterification | 5.75 |
| Sample removed after ½ hour of de-esterification | 6.00 |
| Sample removed after 1 hour of de-esterification | 9.50 |
| Sample removed after 2 hours of de-esterification | Very brittle |

The film was completely de-esterified at the end of two hours. The partial de-esterification for a period of one hour produced a film nearly three times as flexible as the original film.

*Example 3.*—Cellulose acetate containing 15% alphachloronaphthalene was immersed in a sodium hydroxide solution of one-half normal concentration (2% by weight) at 20° to 30° C. The flexibility was increased as follows:

| | Folds |
|---|---|
| Original material | 6.25 |
| After 1 hour de-esterification | 8.25 |
| After 2 hours de-esterification | 10.75 |
| After 3 hours de-esterification | 16.75 |
| After 4 hours de-esterification | 25.50 |
| After 6 hours de-esterification | 59.75 |

The material after six hours of treatment was therefore nearly ten times as flexible as the original material and such material is adapted for uses for which the original material could not be used successfully.

The procedure as described provides a simple and effective method for improving the quality of cellulose ester films. The de-esterification agents and the methods employed are relatively inexpensive and the improved films are secured therefore at very slight additional cost.

Various changes may be made in the details of operation and particularly in the selection of agents for the de-esterification of the films without departing from the invention or sacrificing any of the advantages.

Having thus described our invention, what we claim as new and desire to secure by Letters Patent is:

1. The process of increasing the flexibility of cellulose nitrate films which comprises treating at least one side of the film with an aqueous ammonium hydrosulphide solution for a period necessary only to form a layer of de-esterified cellulose nitrate on the film.

2. The process of increasing the flexibility of cellulose nitrate films which comprises treating at least one side of the film with a 3% aqueous ammonium hydrosulphide solution for a period necessary only to form a layer of de-esterified cellulose nitrate on the film.

Signed at Rochester, New York, this 4th day of March, 1929.

CYRIL J. STAUD.
THOMAS F. MURRAY, Jr.